July 19, 1960  A. BOSSETTI  2,945,279
PASSAGE CONTINUOUS KILN FOR FIRING CERAMIC MATERIAL
Filed July 26, 1956  4 Sheets-Sheet 1
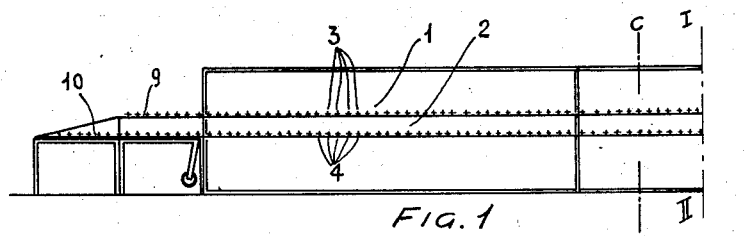
FIG. 1
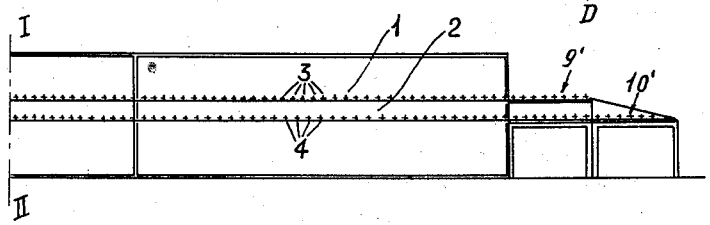
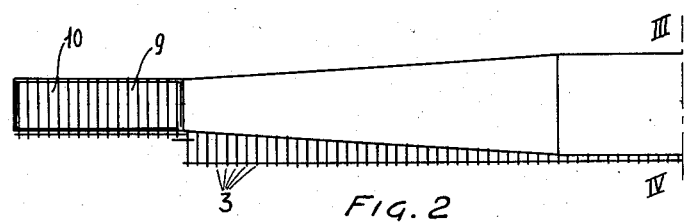
FIG. 2
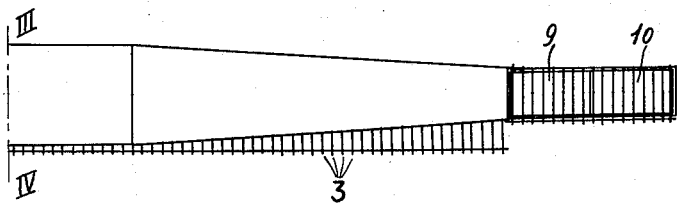
INVENTOR
ADRIANO BOSSETTI
BY
ATTORNEY July 19, 1960 A. BOSSETTI 2,945,279
PASSAGE CONTINUOUS KILN FOR FIRING CERAMIC MATERIAL
Filed July 26, 1956 4 Sheets-Sheet 2

INVENTOR
ADRIANO BOSSETTI

BY *Greene, Pineles and Durr*

ATTORNEY

July 19, 1960 A. BOSSETTI 2,945,279
PASSAGE CONTINUOUS KILN FOR FIRING CERAMIC MATERIAL
Filed July 26, 1956 4 Sheets-Sheet 3

INVENTOR
ADRIANO BOSSETTI

BY

ATTORNEY

United States Patent Office 2,945,279
Patented July 19, 1960

2,945,279

PASSAGE CONTINUOUS KILN FOR FIRING CERAMIC MATERIAL

Adriano Bossetti, % Racheli Bossi & C., Via P. Verri 6, Milan, Italy

Filed July 26, 1956, Ser. No. 600,297

Claims priority, application Italy July 28, 1955

5 Claims. (Cl. 25—142)

It is known that one of the greatest advantages of electric passage kilns of very recent design, in comparison with the usual car type electric kilns, consists in the stationary kiln sole over which slides, suitably actuated by a pushing device, a movable sole of very reduced thickness, comprising plates of refractory material of limited dimensions, upon which are placed the charges of ceramic material to be fired.

Such a movable sole offers the very remarkable advantage of being considerably lighter than the heavy insulating refractory structures constituting the flat top of the charge cars which require a huge amount of electric power for heating, power that for the most part is lost when the cars leave the kiln at a high temperature.

The flat top of such cars, as now in use, may have a thickness in excess of 50 cms. and requires, besides, a very high and expensive maintenance of the refractory material, such material being subjected to temperature differences that cause breakages which, quite often may even jeopardize the efficiency of the kiln tunnel itself.

The movable sole, made up of refractory plates of limited thickness, in the continouous passage electric kilns, already provides a very remarkable advantage, but still represents the weak point of such kilns, inasmuch as the plates, due to the remarkable temperature differentials to which they are subjected, and due to the fact that the firing cycle is rather short (down to 6–7 hours), break easily, and this may cause severe damage due to the overturning of the charge, obstruction of the tunnels, etc., besides the cost of replacing the plates themselves.

The movement of these plates, which develop high friction on the kiln sole, also made of refractory material, requires the use of an accurate and complex thrust mechanism; there is also a considerable amount of dust generated that may deposit on the material being fired, damaging the finish of the surfaces of the pieces, be they in the bisk, or gloss or decor firing cycle.

Further, the gross weight of the sliding plates, is very high in respect to the useful weight of the material being fired and therefore, there are losses due to the waste of the energy required for heating, at each passage, the whole body of moving refractory material.

The present invention overcomes all of these inconveniences inasmuch as it provides for the substititon for the refractory sole, a movable sole consisting of rollers, made of stainless steel rods or tubings, or of carborundum or refractory material, depending on the operating temperature, actuated from the outside by an endless chain driving the sprocket wheels securely keyed on one end of the said rollers.

The object of the present invention is to provide special measures designed to make such a sole suitable for the ceramic industry, wherein the kilns utilizing such soles reach very high temperatures, even up to 1300° C.

The accompanying drawings illustrate diagrammatical-ly and by way of example, a practical embodiment of the kiln according to the invention, and namely:

Fig. 1 is a side elevational view, very diagrammatical, of a kiln provided with revolving roller soles;

Fig. 2 is a top view of the kiln of Fig. 1;

Figure 5:
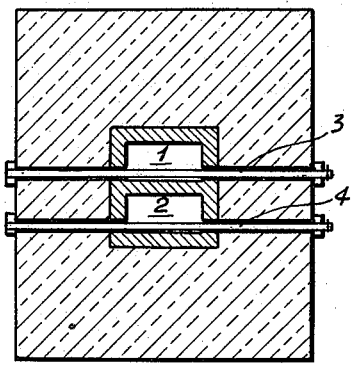
Fig. 5 is a transverse section of the kiln of Fig. 1 taken on line C—D of Fig. 1.
Figure 6:
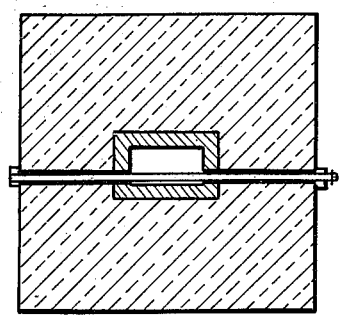
Fig. 6 represents a transverse section of modified form of kiln having a single tunnel.

The kiln illustrated in Fig. 1 and shown in transverse section in Fig. 5, has two tunnels 1 and 2 each having at its bottom a sole 3 or 4, respectively, made up of a plurality of rotatable rollers 5, the center-lines whereof are indicated by the small crosses shown in Fig. 1.

The ceramic material to be fired, placed upon suitable carborundum plates, is introduced with great care in the tunnels 1 and 2 and once placed upon said rollers 5, is carried through from one end to the other, at such a speed as to keep the material inside the kiln for all the time required to complete its firing. The heating of the kiln is obtained in any known way, its main characteristic being the sole and the related members combined therewith.

Figure 3:
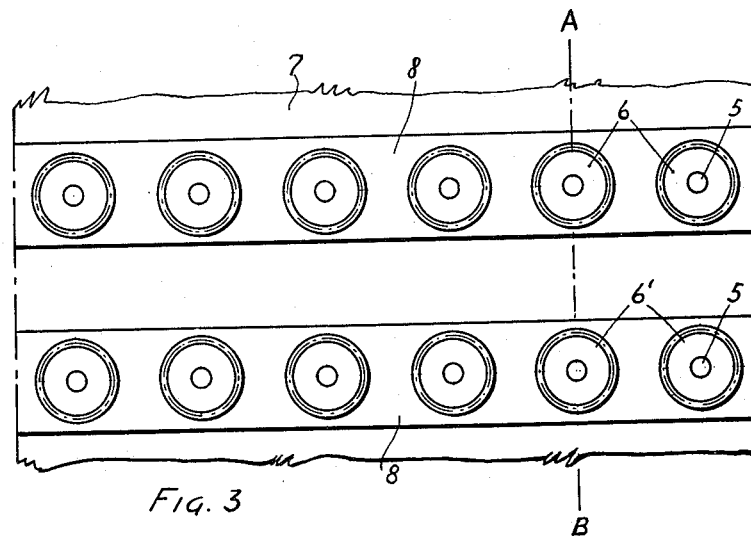
Fig. 3 is a side view of a portion of the wall of the kiln in Fig. 1 showing the sprocket wheels for chain drive actuation of the rollers constituting the sole.
Figure 4:
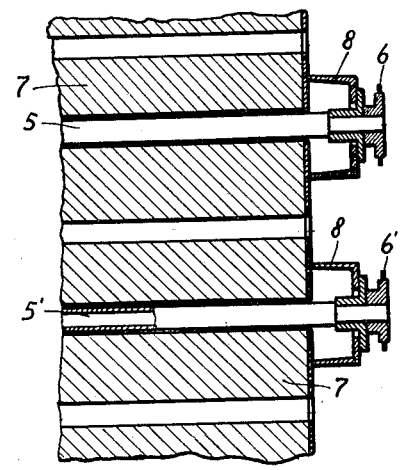
Fig. 4 is a section through the wall of Fig. 3, taken on line A—B of Fig. 3.
Figure 9:
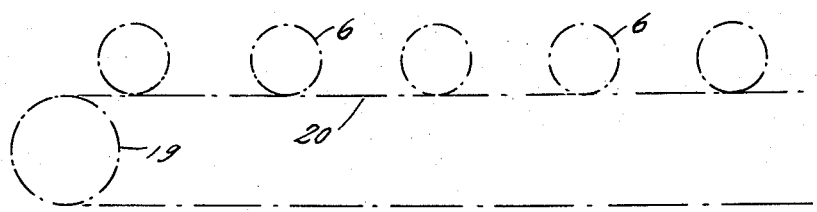
Fig. 9 is a diagrammatic view illustrating how the rollers are driven.

More specifically, the rollers 5 and 5' such as clearly represented in Fig. 4, carry keyed on their outside projection, a sprocket wheel 6 or 6', respectively, on which is wound the driving chain 20 for rotating the rollers as shown in Fig. 9. Between the wall 7 of the kiln, and the sprockets 6, there are arranged, astride each end of the rollers 5 or 5', cooling chambers 8 that will be described more fully later on.

Figure 8:
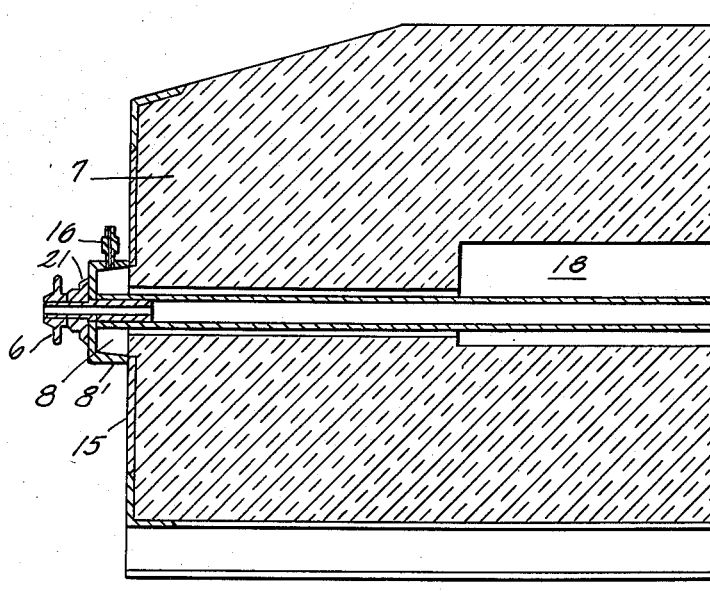
Fig. 8 is a detail cross sectional view to show the structure of the rollers.

Preferably the rollers 5 or 5', as well as the bearings and the sprockets, are suitably cooled and the cooling systems used will be different depending on the temperature to which these members are subjected; in particular the bearings and the sprockets are cooled preferably by a current of air, introduced into the airtight chambers 8 on the wall 7 through tap 16 (see Fig. 8). The chamber 8 is formed between chamber body 8' and the casing 15 of the furnace. Chamber body 8' carries the bearing 21 for sprocket 6 and its shaft. Such an arrangement has in addition the advantage of providing a heat-insulation for the side walls of the kiln, and of preventing leakage by conduction, of the heat carried to the outside by the ends of the rollers. With such an arrangement in fact, the atmosphere inside the firing tunnel of the kiln has a lower pressure than that prevailing in the air-tight chambers 8, hence there will be no loss of hot gas through the bearings of the rollers, nor leakages to the outside.

The cooling of the hollow stainless steel rollers 5 and 5' will be effected by means of a fluid selected according to the temperature; this fluid can therefore be air, water, oil and the like.

Each cooling chamber 8, running along the kiln wall and enclosing the ends, protruding from the kiln, of the rollers 5 constitutes a single sole and is made of sheets of steel or other suitable metal, lined with an insulating material, and connected by air-tight means to the wall 7 of said kiln. Inside said chamber there is made to circulate a stream of cooling medium, preferably or usually air, at a suitable temperature and such as to generate inside said chambers a pressure slightly greater than the pressure existing in the inside of the kiln.

As it has already been mentioned, the transportation of the material being fired, inside of each of the tunnels 1 and 2, as illustrated, is effected by means of small plates of carborundum (not shown) which may be reinforced and braced with small stainless steel frames.

By such an arrangement, the need for refractory plates which are quite thick and heavy and which take up a a remarkable amount of the heat supplied to the kiln is eliminated. Since the charge, or the amount of material to be heated is limited, it is possible to obtain very short firing cycles, and hence a very high rate of production.

The kiln according to the invention, since it is adatped to operate at all temperatures between 600° and 1300° C., permits firing of all types of ceramic materials, that is the bisk firing, the gloss firing and the decor firing.

For this reason, such kilns may even have multiple tunnels, instead of a single one, and each row of tunnels can be operated at different temperatures, so as to permit different firings with a single kiln.

Thus for instance (see Fig. 1) the tunnels 11 can operate at a temperature of 120° C., the tunnels 12 at a temperature of 1100° C., and the tunnels 13 at a temperature of 600° C., simultaneously.

By suitably extending the servicing tables, which are shown at 9 and 10 in Figs. 1 and 2, and by suitably connecting same by means of belt conveyors to the different other equipment effecting the other stages of processing the ceramic material, it is possible to almost completely eliminate the labor required for loading and unloading the kiln.

From the preceding description it is apparent that great advantages can be obtained in the ceramic industry with the kiln provided with the sole according to the invention.

Of course, the constructive details of the different elements constituting the kiln, and in particular the sole, may vary according to needs without therefore departing from the scope of the present invention.

What I claim is:

1. In a tunnel kiln for the firing of ceramics of the type having at least one sole or floor consisting essentially of a horizontal series of parallel supporting rollers extending transversely of and through the sides of said kiln and each of said rollers having means at the corresponding end thereof for positively rotating the same to propel plates placed on the floor of said kiln therethrough, the improvement comprising at least one chamber affixed to and extending along said kiln between the means for rotating said rollers and the side of said kiln, said chamber having a substantially gas tight connection to the side of the kiln and comprising a plurality of gas tight bearings for the rollers whereby a part of that portion of the rollers which extends outside the kiln is surrounded by said chamber through which cooling gas under pressure is adapted to be introduced and means for introducing cooling gas to said chamber.

2. The device as claimed in claim 1 wherein said rollers are made of carborundum.

3. In the device as claimed in claim 1, wherein said kiln comprises at least two horizontally aligned tunnels and one horizontal series of rollers.

4. In the device as claimed in claim 1, wherein said kiln comprises at least two tunnels, one superposed upon the other and two horizontal series of supporting rollers.

5. The kiln as claimed in claim 1, comprising a multiplicity of said parallel supporting rollers, and a corresponding number of said chambers, a spearate chamber between the rotating means for each of said roller and the side of said kiln.

References Cited in the file of this patent

UNITED STATES PATENTS

| 763,892 | Hirschmann | June 28, 1904 |
| 1,416,727 | McDougal | May 23, 1922 |
| 1,447,702 | Whittemore | Mar. 6, 1923 |
| 1,891,469 | Coleman | Dec. 20, 1932 |
| 1,938,581 | Cope et al. | Dec. 12, 1933 |
| 1,989,957 | Walters | Feb. 5, 1935 |
| 2,819,415 | Waterman | Jan. 7, 1958 |

UNITED STATES PATENT OFFICE
CERTIFICATION OF CORRECTION

Patent No. 2,945,279                      July 19, 1960

Adriano Bossetti

It is hereby certified that error appears in the above numbered patent requiring correction and that the said Letters Patent should read as corrected below.

Figure 7:
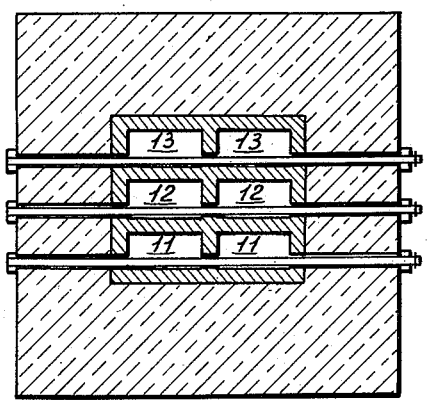
Fig. 7 is a transverse section of another modified form of kiln having multiple tunnels.

Column 3, line 26, for "(see Fig. 1)" read -- (see Fig. 7) --; line 27, for "120° C." read -- 1200° C. --.

Signed and sealed this 13th day of June 1961.

(SEAL)
Attest:

ERNEST W. SWIDER                      DAVID L. LADD
Attesting Officer                       Commissioner of Patents